US005345686A

United States Patent [19]

Zimmermann

[11] Patent Number: 5,345,686

[45] Date of Patent: Sep. 13, 1994

[54] CUTTING ARRANGEMENT FOR A MOTOR-DRIVEN CHAIN SAW

[75] Inventor: Helmut Zimmermann, Kernen i. R., Fed. Rep. of Germany

[73] Assignee: Andreas Stihl, Waiblingen, Fed. Rep. of Germany

[21] Appl. No.: 77,772

[22] Filed: Jun. 18, 1993

[30] Foreign Application Priority Data

Jun. 18, 1992 [DE] Fed. Rep. of Germany ....... 4219956

[51] Int. Cl.[5] ........................ B23D 57/02; B27B 17/14

[52] U.S. Cl. .......................................... 30/386; 30/383

[58] Field of Search .................. 30/386, 385, 383, 381

[56] References Cited

U.S. PATENT DOCUMENTS 2,532,981 12/1950 Wolfe .................................... 30/385
2,992,660 7/1961 Merz ..................................... 30/386
3,232,325 2/1966 Hamilton .............................. 30/386
3,279,508 10/1966 Ehlen et al. ........................... 30/385
4,316,327 2/1982 Scott et al. ............................ 30/386
5,144,751 9/1992 Weber ................................ 30/383 X
5,174,029 12/1992 Talberg ............................ 30/385 X

*Primary Examiner*—Richard K. Seidel
*Assistant Examiner*—Kenneth E. Peterson
*Attorney, Agent, or Firm*—Walter Ottesen

[57] ABSTRACT

The invention is directed to a cutting arrangement for a motor-driven chain saw and is configured as a preassembled component which includes a guide bar having a saw chain and sprocket drive wheel. A tensioning device is integrated into the guide bar for holding the parts of the component together. The tensioning device holds the sprocket drive wheel at a spacing from the end face of the guide bar. The tensioning device is adjustable when placing the component on the housing of the chain saw in such a manner that the sprocket drive wheel is released while the saw chain remains under tension. The component can be disassembled into its individual parts by adjusting the tensioning device.

35 Claims, 4 Drawing Sheets

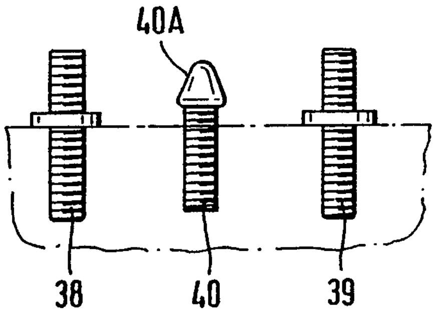
Fig. 4
Fig. 5a
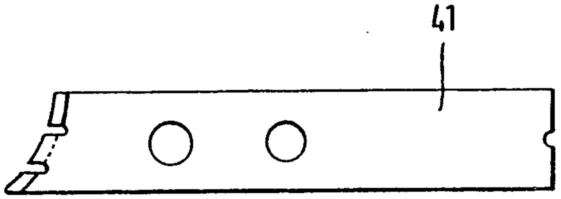
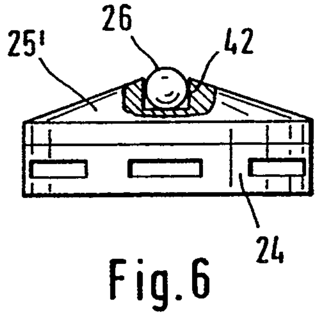
Fig. 6
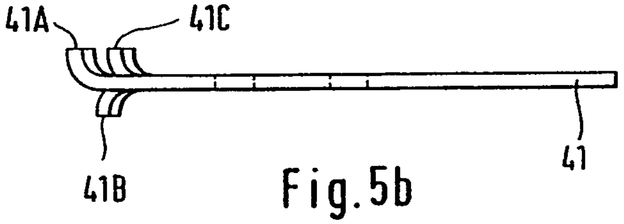
Fig. 5b
Fig. 7
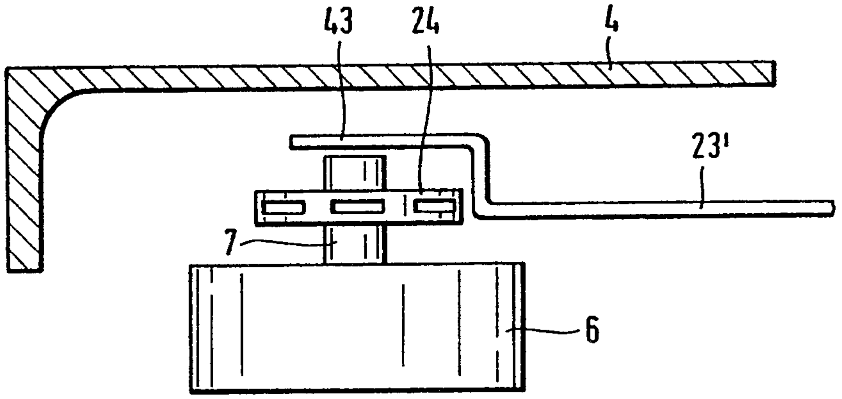
Fig. 8
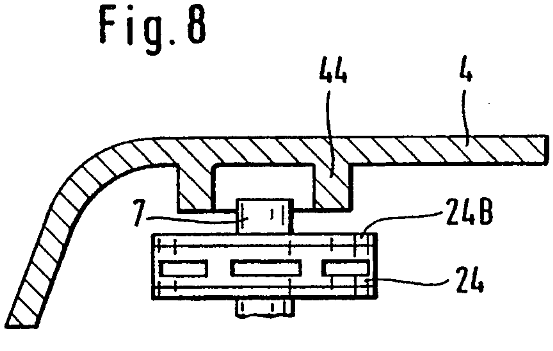
Fig. 9
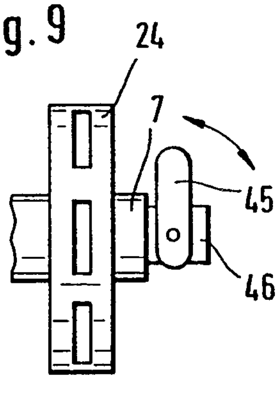

CUTTING ARRANGEMENT FOR A MOTOR-DRIVEN CHAIN SAW

BACKGROUND OF THE INVENTION

The cutting arrangement for a motor-driven chain saw usually comprises a saw chain, a guide bar for the saw chair and a sprocket drive wheel which is driven by the motor shaft of the chain saw. The guide bar has one or more elongated slots for receiving attachment bolts with which the guide bar is attached to the housing of the chain saw. These parts are often individually present whereby the assembly of the cutting arrangement on the housing of the chain saw is complex. First the sprocket drive wheel is pushed onto the motor shaft or a collar of a coupling and the guide bar is pushed onto attachment bolts of the chain saw housing. Thereafter, the chain is mounted and a cover covering the sprocket drive wheel is fixed to the chain saw housing with nuts which threadably engage the attachment bolts. Thereafter, the saw chain is tensioned and then the nuts are tightened on the attachment bolts in order to securely clamp the guide bar to the housing.

It is also known to preassemble parts of the cutting arrangement as a component during manufacture in order to facilitate this assembly work. The component can then be mounted on the housing of a chain saw configured in a suitable manner.

One such cutting arrangement is disclosed in U.S. Pat. No. 2,992,660. This cutting arrangement includes two mounting plates in addition to the guide bar, sprocket drive wheel and the mounted saw chain. The two assembly plates are mounted on both sides of the guide bar and, together with the guide bar, are mounted on the attachment bolts of the chain saw housing. In the preassembled component, the sprocket drive wheel is disposed either between two side plates of the three-part guide bar or between two cover washers having contours to which the guide bar is adapted. The chain can be tensioned by means of a saw chain tensioning device after mounting the component. The saw chain tensioning device comprises an adjusting screw seated in the saw chain housing with the head of this screw extending into a cutout of the inner mounting plate. In this way, the guide bar can be displaced relative to the sprocket drive wheel mounted on the motor shaft. The preassembled component is held together only by the saw chain which is not yet tensioned to its operational length but must nonetheless be so short that the parts of the component do not fall apart. Therefore, the saw chain can not simply be removed and exchanged on the component itself nor even after the component is mounted on the chain saw. This capability of removing and exchanging the saw chain is desirable because of wear and is also possible on conventional cutting arrangements which are not preassembled.

U.S. Pat. No. 4,316,327 discloses a similar cutting arrangement configured as a preassembled component. Here, the sprocket drive wheel is disposed in a chamber which is defined by bent-over sections of the two side plates of the three-part guide bar. An adjusting screw is mounted on the end of the guide bar for tensioning the saw chain. The adjusting screw engages in a bushing of the chain saw which is fixed on the housing. With this configuration too, the continuous saw chain cannot be removed from the guide bar and the sprocket drive wheel. The removal and also the threading of the saw chain is only possible when the saw chain is open and, for this purpose, one of the chain links must be removed and then later connected to another chain link.

SUMMARY OF THE INVENTION

It is an object of the invention to provide a cutting arrangement for a motor-driven chain saw which is configured as a preassembled component. It is another object of the invention to provide such a cutting arrangement that is easy to manipulate when mounting the same on the chain saw and also for maintenance and repair work.

The cutting arrangement of the invention is for a motor-driven chain saw having a drive shaft. The cutting arrangement includes: a preassembled component to be fastened to the chain saw; at least one attachment bolt for connecting the preassembled component to the chain saw; and, the preassembled component including: a saw chain; a sprocket drive wheel for connecting the saw chain to the drive shaft; a guide bar having an outer periphery and having a guide groove formed thereon for guiding the saw chain along the outer periphery; the guide bar having forward nose means for changing the direction of the saw chain as the saw chain moves around the guide bar; the guide bar having a rearward end facing away from the forward nose means and having at least one slot formed therein for receiving the attachment bolt when the preassembled component is mounted on the chain saw; the sprocket drive wheel being disposed adjacent the rearward end and near to the one slot; a tensioning device for holding the guide bar, the sprocket drive wheel and saw chain together under tension to define the preassembled component; and, the tensioning device being mounted in the guide bar so as to constitute a part thereof.

The arrangement of the tensioning device as a component part of the guide bar permits the sprocket drive wheel and the guide bar to be held together by means of the tensioned saw chain and the arrangement nonetheless permits the saw chain to be removed and exchanged as required. The tensioning device is manipulated for this purpose. The tensioning device is then so configured that the saw chain remains tensioned by mounting the component on the chain saw housing. With this assembly, the tensioning device is rigidly connected to the attachment bolt mounted on the housing. The attachment bolt is at a pregiven spacing from the drive shaft of the sprocket drive wheel so that the sprocket drive wheel is released from the tensioning device. Because the tensioning device is now fixed in position on the housing, the tensioning device acts on the guide bar and displaces the same whereby the saw chain retains its operational tension.

BRIEF DESCRIPTION OF THE DRAWINGS

The invention will now be described with reference to the drawings wherein:

FIG. 4 is a schematic representation of a variation of the attachment of the guide bar to the chain saw housing;

FIG. 5*a* is a schematic plan view of an alternate embodiment of a pressure piece configured as a slide;

FIG. 5*b* is a side elevation view of the pressure piece shown in FIG. 5*a;*

FIG. 6 is a schematic side elevation view of a cover cap for the sprocket drive wheel;

FIG. 7 is a schematic side elevation view of a pressure piece configured as a slide with the sprocket drive wheel corresponding thereto for limiting the axial movement of the sprocket drive wheel;

FIG. 8 is a schematic side elevation view showing the sprocket drive wheel in combination with the housing cover for limiting the axial movement of the sprocket drive wheel; and, FIG. 9 is a schematic side elevation view of the sprocket drive wheel with a holding member mounted on the motor shaft.

DESCRIPTION OF THE PREFERRED EMBODIMENTS OF THE INVENTION

Figure 1:
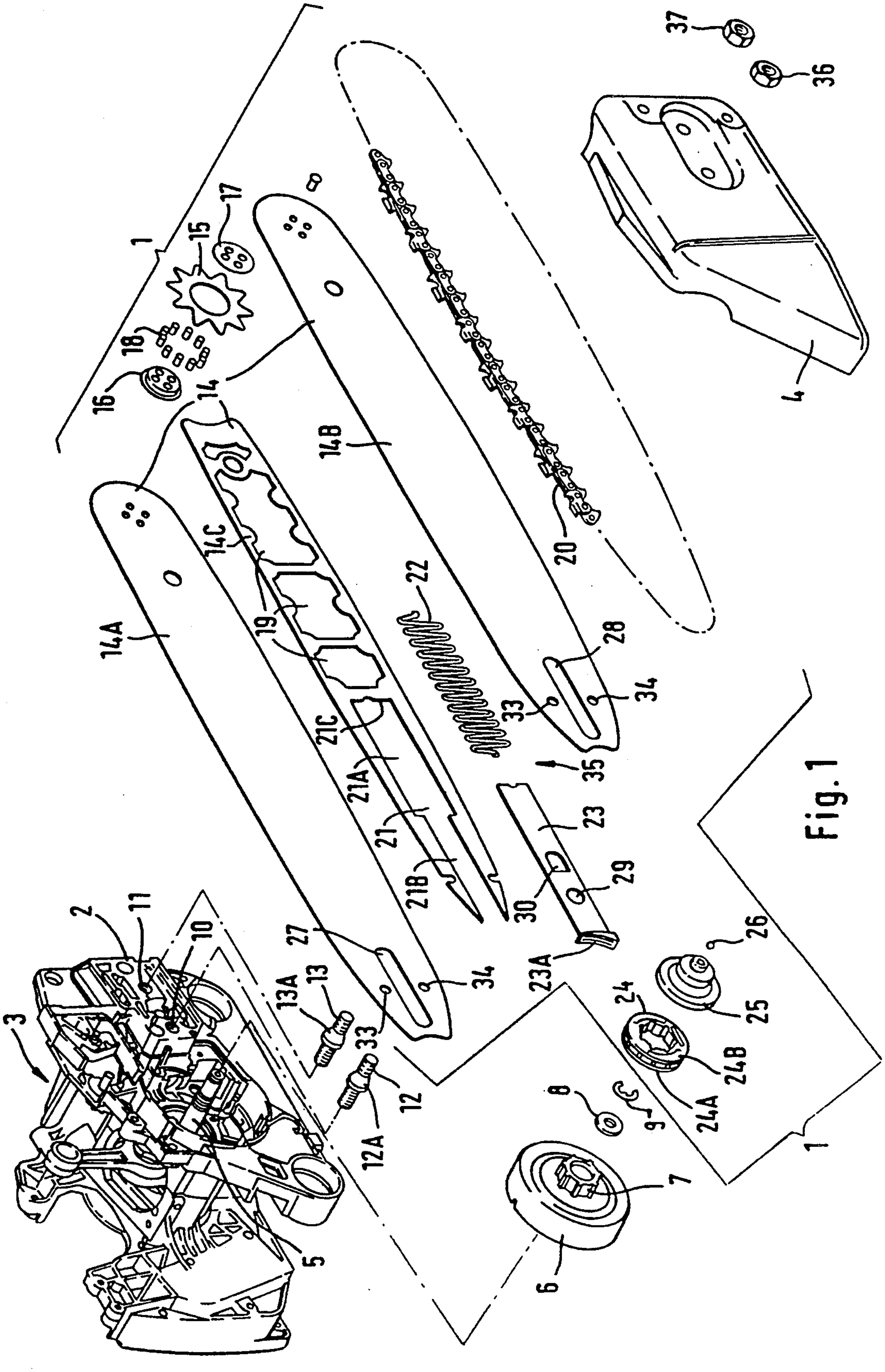
FIG. 1 is an exploded perspective view of the cutting arrangement according to the invention which shows the individual parts thereof as well as the chain saw housing and a housing cover.

The cutting arrangement 1 shown in FIG. 1 is intended to be mounted on a housing part 2 of the inner housing 3 of a motor-driven chain saw. The cutting arrangement 1 is covered by a housing cover 4 in the region of the housing part 2 after mounting.

A crankshaft 5 is journalled in the housing and a centrifugal-force coupling 6 is pushed onto the crankshaft 5 in the embodiment shown. The coupling 6 has a slotted lug 7 and is journalled so as to be rotatable relative to the crankshaft 5. The centrifugal-force coupling 6 is axially fixed with slight play by means of a support washer 8 and a holding ring 9. Two threaded bores 10 and 11 are provided in the housing part 2 for accommodating respective attachment bolts 12 and 13.

The cutting arrangement 1 includes as guide bar 14 which comprises two side plates 14A and 14B as well as a center plate 14C. The center plate 14C is shorter than the two side plates and has an outer end. A nose sprocket wheel 15 is mounted next to the outer end of the center plate 14C and between the two side plates 14A and 14B. The nose sprocket wheel is journalled by means of rollers 18 between two cover discs 16 and 17. Several cutouts 19 are provided in the center plate 14C to reduce the weight of the guide bar. The two side plates 14A and 14B and the smaller center plate 14C conjointly define a guide groove for the saw chain 20 after assembly.

An elongated cutout 21 is provided in the center plate 14C which is open in the direction toward the inner end of the guide bar 14 facing toward the housing 3. In the embodiment shown, the cutout 21 has a rectangularly-shaped section 21A which extends stepped into a slot-shaped section 21B defining the open end. Section 21B has a width less than section 21A. A flat sinusoidally-shaped bent spring 22 is inserted in section 21A of the cutout. The spring 22 resiliently biases a slide 23 to be inserted in the slot-shaped section 21B. The slide 23 acts as a pressure piece on a sprocket drive wheel 24. This sprocket drive wheel 24 is slotted in correspondence to the shaft lug 7 of the coupling 6 and is to be pushed onto this lug. The sprocket drive wheel 24 is configured as a single piece with the cover discs 24A and 24B. A cap 25 is to be attached to the outer cover disc 24B. The cap 25 is configured so as to have a stepped cylindrical shape and a ball 26 is to be recessed in the outer end of the cap 25. For the cutting arrangement mounted on the chain saw housing 3, the cap 25 coacts with the housing cover 4 for limiting the axial movement of the sprocket drive wheel 24.

The two side plates 14A and 14B have respective elongated slots 27 and 28 near the inner ends thereof. The elongated slots 27 and 28 are in mutual alignment when the cutting arrangement is mounted. A through opening 29 for the attachment bolt 12 and a pass-through opening 30 for the attachment bolt 13 are provided in the slide 23.

Figure 2:
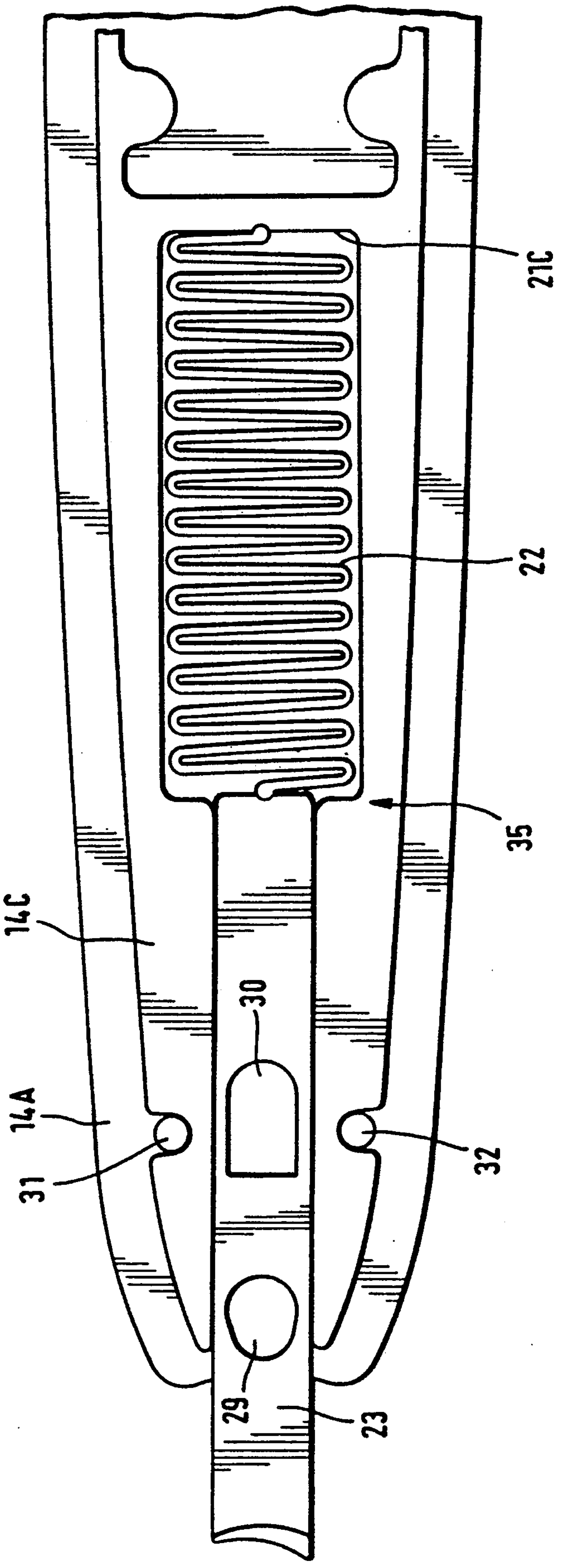
FIG. 2 is an enlarged detail side elevation view of a portion of the guide bar with one of the side plates removed and showing the arrangement of the tensioning device.
Figure 3:
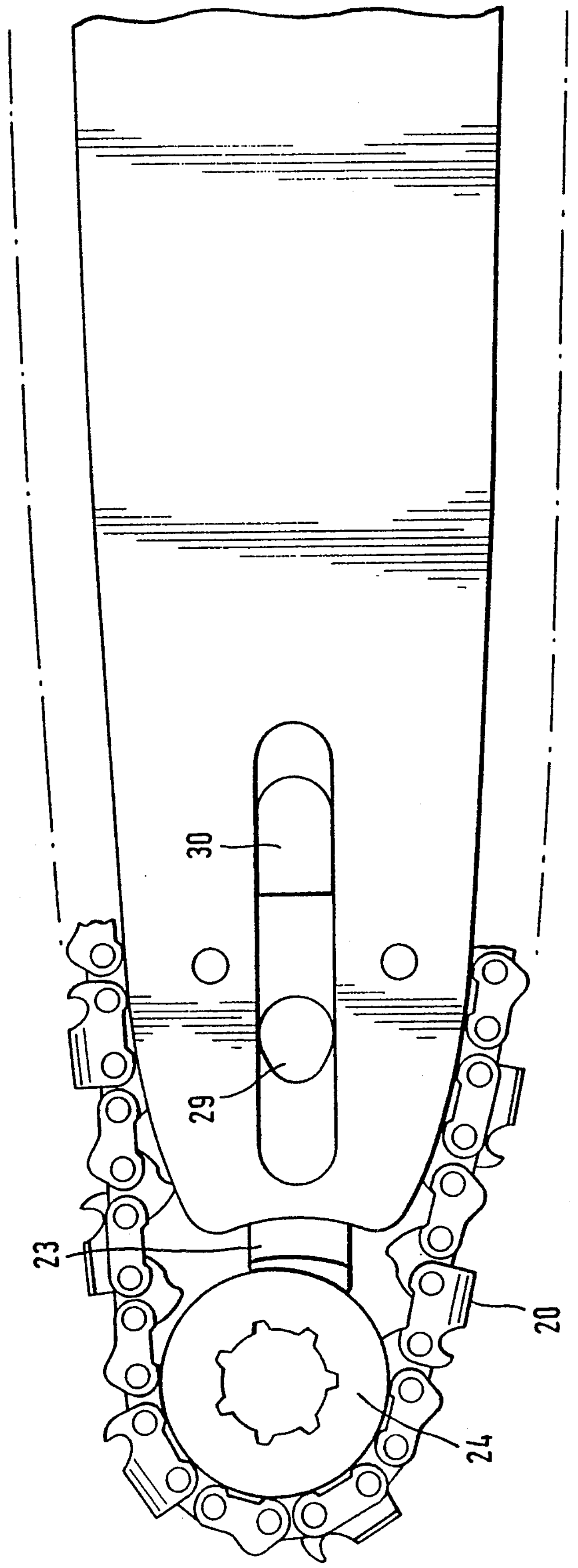
FIG. 3 is a side elevation view corresponding to FIG. 2 but with the guide bar assembled and also showing the sprocket drive wheel and the saw chain.

The guide bar 14 together with its nose sprocket 15 and the slide 23 seated with spring 22 is preassembled with the sprocket drive wheel 24 and the saw chain 20 to form a component defining the cutting arrangement 1. FIG. 2 shows the side plate 14A with the center plate 14C positioned thereon. The center plate 14C is adapted with respect to its contour to two bolts 31 and 32. Bores 33 and 34 are provided in the side plates 14A and 14C, respectively, for the two bolts 31 and 32. The slide 23 is resiliently biased by the spring 22 which is braced on the inner end 21C of the section 21A of the cutout 21 as well as on the rear end of the slide 23. As shown in FIG. 2 in combination with FIG. 3, the slide 23 is thereby pressed against the cover discs of the sprocket drive wheel 24. For this purpose, the slide has a projection 23A which is adapted to the contour of the cover discs of the sprocket drive wheel. This projection defines a widening of the slide 23 configured as a flat part. The slide 23 has a thickness somewhat less than the thickness of the center plate 14C to permit the displacing movement. The sprocket drive wheel 24 is pressed away from the guide bar 14 as a consequence of the slide being resiliently biased and is held together by the saw chain 20 with the saw chain being tensioned thereby. The slide 23 together with the spring 22 therefore defines a tensioning device 35 which is a component part of the guide bar 14 and therewith the guide bar per se. The guide bar, the sprocket drive wheel 24 and the saw chain 20 are then tensioned together by the tensioning device to form the cutting arrangement 1, that is, the preassembled component.

For assembling this component 1, the chain saw is advantageously so arranged with its housing 3 that the end of the crankshaft 5 or, more specifically, the shaft lug 7 of the coupling 6 is directed approximately vertically upwardly. The coupling 6 is seated on the shaft. The two attachment bolts 12 and 13 (FIG. 1) are threadably engaged in the threaded bores 10 and 11, respectively, on the finished chain saw housing. The attachment bolts 12 and 13 are thereby aligned to be parallel to the shaft lug 7. Thereafter, the cutting arrangement 1 is positioned in such a way that the sprocket drive wheel 24 is first pushed a predetermined amount onto the shaft lug 7 for which purpose the coupling 6 is rotated somewhat as may be required so that the shaft lug 7 can engage in the inner slots of the sprocket drive wheel 24. With this positioning of the cutting arrangement, the two threaded bolts 12 and 13 extend into the slot 27 of the side plate 14A with their outer threaded sections and extend also into the through opening 29 and the pass-through opening 30, respectively, of the slide 23 as well as extend into the elongated slot 28 of the other side plate 14B. The start position of the slide 23 is when the slide is in contact engagement with the sprocket drive wheel 24. To enable the slide 23 to release the sprocket drive wheel 24, the axial spacing between the sprocket drive wheel and the through bore 29 is less than the axial spacing between the shaft lug 7 and the attachment bolt 12 threadably engaged in the threaded bore 10. This bolt 12 therefore first has an eccentric position in the through opening 29 with the through opening 29 having a diameter correspondingly greater than the outer threaded shaft of the attachment bolt 12. This attachment bolt has a thickening 12A bordering on the outer portion of its threaded shaft. The thickening 12A is conically expanded in the direction toward the housing part 2. By pushing the cutting arrangement further on the shaft lug 7 and the attachment bolts, the slide 23 is pushed over the thickening 12A of the attachment bolt 12 in such a way that the axial spacing between the sprocket drive wheel 24 and the through opening 29 is increased to correspond to the axial spacing between the shaft lug 7 and the threaded bore 10 or the attachment bolt 12 threadably engaged therein. In this way, the end appendage 23A of the slide 23 releases the sprocket drive wheel 24 for the drive by the shaft lug 7. The attachment bolt 12 with its thickening 12A lies with slight play in the through opening 29. The other attachment bolt 13 is configured in the same manner as the attachment bolt 12. The through opening 30 is configured as a slot so that a tolerance is permitted on the one hand between the spacing of the bolts 12 and 13 on the chain saw housing and between the axial spacing between the through opening 29 and the through opening 30 on the other hand. The primary purpose of the second attachment bolt 13 is to secure the guide bar 14 against pivoting about the attachment bolt 12 after mounting on the chain saw housing and to guarantee a high clamping force for the guide bar.

The displacing movement of the slide 23 when the cutting arrangement 1 is seated on the shaft lug 7 and the attachment bolts 12 and 13 results in the condition that the spring 22 becomes effective between the slide 23 fixed on the housing and the guide bar. The spring 22 is braced via the slide 23 against the bolt 12 and operates on the guide bar 14 and the nose sprocket 15 journalled in the guide bar as well as the sprocket drive wheel 24 fixed to the housing. Even after the slide 23 is lifted from the sprocket drive wheel 24, the saw chain 20 remains under tension by means of the spring 22. On correspondence to this operating tension of the saw chain, the spring 22 is dimensioned so that the correct saw chain tension adjusts after seating the cutting arrangement.

The housing cover is placed after seating the cutting arrangement on the housing of the chain saw. Thereafter, nuts 36 and 37 are threadably engaged on the two attachment bolts 12 and 13. The guide bar is clamped between the housing 2 and the housing cover 4 when the nuts are tightened. The slide 23 has a width greater than the slots 27 and 28 of the side plates 14A and 14B to obtain the largest possible clamping force. Accordingly, when the mounting of the cutting arrangement is completed, the slide 23 is clamped with its longitudinal edges between the side plates 14A and 14B. The thickness of the slide 23 is then only that much less than the thickness of the center plate 14C that, before clamping the cutting arrangement tight on the chain saw housing 3, a relative displacement is possible between the guide bar 14 and the slide 23. Frictional resistance between these parts is permissible within reasonable limits. The friction force between the slide 23 and the side plates 14A and 14B of the guide bar is substantially greater after the nuts 36 and 37 are tightened. After the nuts are tightened, this friction force effects an additional clamping force so that an especially reliable attachment of the guide bar to the chain saw housing is ensured.

When the saw chain has become longer because of wear or heat expansion during operation, it is only necessary to loosen the nuts 36 and 37 so that the clamping force of the guide bar on the housing is reduced and so that the guide bar can be moved forward under the force of the spring 23 whereby the saw chain is again tensioned. Thereafter, the nuts are again tightened.

A special advantage of the arrangement described above is that the tensioning device, which is integrated into the guide bar, has two functions. On the one hand, the tensioning device holds the parts together in the preassembled component and, on the other hand, operates as a saw chain tensioning device for the operating condition of the cutting arrangement.

In the embodiment, the spring 22 is a four-edge wire, but can also be a round wire. The spring is stamped from sheet metal and, departing from the illustrated embodiment, can be stamped as one piece with the center plate 14C. In this case, the material of the spring must be deformed in a direction perpendicular to the main plane of the center plate to a reduced thickness, for example by being pressed together, so that the spring can move in the section 21A of cutout 21 unimpeded by the side plates 14A and 14B. Other embodiments of the spring are also possible such as a leaf spring or a leaf spring packet configuration.

The cutting arrangement can be mounted on the chain saw housing with the fewest possible manual movements. This can be done by omitting a special axial holder of the sprocket drive wheel 24 on the shaft lug 7. In lieu thereof, the sprocket drive wheel 24 is provided with a cap 25 in which the ball bearing 26 is seated. An axial displacement of the sprocket drive wheel can occur during operation for example because the saw chain can become wedged in a branch. If this axial displacement does take place, the cap 25 with the ball bearing 26 and the housing cover 4 conjointly define a stop which prevents the sprocket drive wheel 24 from slipping of the shaft lug 7.

The saw chain 20 can be removed from the guide bar and the sprocket drive wheel for maintenance purposes or for exchanging the same for another saw chain without it being necessary to disassemble the guide bar from the chain saw housing. For this purpose, it is sufficient to loosen the nuts 36 and 37 on the attachment bolts 12 and 13 so that the guide bar can be displaced against the force of the spring 22 in the direction toward the sprocket drive wheel whereafter the saw chain can be removed from the sprocket drive wheel. The saw chain can be placed on the guide bar for preassembling the cutting arrangement in a like simple manner whereafter the sprocket drive wheel is fitted into the saw chain while simultaneously sliding the slide 23 against the spring pressure and then the cutting arrangement is tensioned with the saw chain. The removal of the saw chain from the preassembled component is performed with the same ease.

FIGS. 4 to 9 show different variations of the individual parts of the cutting arrangement.

In FIG. 4, two threaded bolts 38 and 39 having respective collars are provided in lieu of the attachment bolts 12 and 13 which are thickened in the middle. Through openings having a larger diameter (not shown) are provided in the slide 23 for the two threaded bolts 38 and 39. A guide opening corresponding to the bore 29 is provided mid way between these through openings. A pin 40 having a conically tapered head 40A is guided into the guide opening. This pin 40 has the same function as the attachment bolt 12 (FIG. 1).

FIGS. 5a and 5b show another embodiment of the pressure piece which is likewise a slide 41. The end widening in this embodiment is defined by bent-over tangs 41A, 41B and 41C of the slide which is here likewise formed as a flat part.

FIG. 6 shows another embodiment of the stop for limiting the axial displacement of the sprocket drive wheel. This stop is likewise a cap 25' seated on the sprocket drive wheel 24. However, the cap 25' is configured so as to have the shape a truncated cone and to have a cylindrical recess 42 on the outer end of the truncated cone. A ball bearing 26 is mounted in the recess 42.

A further embodiment of the stop is shown schematically in FIG. 7. In this embodiment, a bent-over portion 43 of the correspondingly configured slide 23' is assigned to the coupling 6 seated on the sprocket drive wheel 24. The bent-over portion 43 lies within the housing cover 4 and prevents the sprocket drive wheel 24 from sliding off the shaft lug 7.

A further embodiment for limiting an axial displacement of the sprocket drive wheel 24 is shown in FIG. 8. In this embodiment, an annular projection 44 is provided on the inner side of the housing cover 4. The end of the shaft lug 7 can engage in the projection 44. The sprocket drive wheel 24 is seated on the shaft lug 7. When an axial displacement occurs, the end surface of the cover disc 24B of the sprocket drive wheel reaches the end face of the annularly-shaped projection 44 thereby limiting the axial displacement.

FIG. 9 shows still another embodiment for axially securing the sprocket drive wheel 24 by means of a latch pin 45 which is pivotally mounted on a lug 46 which is pushed into an end face recess of the shaft lug 7.

It is understood that the foregoing description is that of the preferred embodiments of the invention and that various changes and modifications may be made thereto without departing from the spirit and scope of the invention as defined in the appended claims.

What is claimed is:

1. A cutting arrangement for a motor-driven chain saw having a drive shaft, the cutting arrangement comprising:

a preassembled component to be fastened to the chain saw;

at least one attachment bolt for connecting said preassembled component to said chain saw; and, the preassembled component including:

a saw chain;

a sprocket drive wheel for connecting said saw chain to said drive shaft when said preassembled component is mounted on said chain saw;

a guide bar having an outer periphery and having a guide groove formed thereon for guiding said saw chain along said outer periphery;

said guide bar having a forward end and having nose means at said forward end for guiding the saw chain as said saw chain moves around said guide bar;

said guide bar having a rearward end facing away from said forward nose means and having at least one slot formed therein for receiving said attachment bolt when said preassembled component is mounted on said chain saw;

said sprocket drive wheel being disposed adjacent said rearward end and near to said one slot;

resilient biasing means for developing a resilient biasing force between said guide bar and said sprocket wheel which acts in a direction to hold said sprocket wheel away from said guide bar to impart a tension force to said saw chain thereby holding said guide bar, said sprocket drive wheel and said saw chain together under tension without said preassembled component being mounted on said chain saw; and, said tensioning device being mounted in said guide bar so as to constitute a part thereof.

2. The cutting arrangement of claim 1, said guide bar including two side plates and said resilient biasing means being arranged between said side plates.

3. The cutting arrangement of claim 1, said resilient biasing means including a pressure piece supported in said guide bar so as to be displaceable therein in a direction toward said sprocket drive wheel.

4. The cutting arrangement of claim 3, said resilient biasing means including a spring for resiliently biasing said pressure piece toward said sprocket drive wheel.

5. The cutting arrangement of claim 4, said pressure piece being a slide and said resilient biasing means further including guide means for slidably guiding said slide between said side plates.

6. The cutting arrangement of claim 5, said sprocket drive wheel being axially displaceable on said drive shaft; and, stop means for limiting the axial displacement of said sprocket drive wheel relative to said drive shaft.

7. The cutting arrangement of claim 6, said stop means including a housing cover partially covering said guide bar and having an inner wall surface facing said sprocket drive wheel; said sprocket drive wheel having an end face facing said housing cover; and, said housing cover having a projection formed on said inner wall surface for coacting with said end face for limiting said axial displacement.

8. The cutting arrangement of claim 7, said projection being an annular projection formed on said inner wall surface.

9. The cutting arrangement of claim 6, said stop means being a bent-over portion of said slide.

10. The cutting arrangement of claim 4, said spring having a plurality of folds to define an approximately sinusoidal trace.

11. The cutting arrangement of claim 10, said spring being made of flat material.

12. A cutting arrangement for a motor-drive chain saw having a drive shaft, the cutting arrangement comprising:

a preassembled component to be fastened to the chain saw;

at least one attachment bolt for connecting said preassembled component to said chain saw; and, the preassembled component including:

a saw chain;

a sprocket drive wheel for connecting said saw chain to said drive shaft;

a guide bar having an outer periphery and having a guide groove formed thereon for guiding said saw chain along said outer periphery;

said guide bar having a forward end and having nose means at said forward end for guiding the saw chain as said saw chain moves around said guide bar;

said guide bar having a rearward end facing away from said forward nose means and having at least one slot formed therein for receiving said attachment bolt when said preassembled component is mounted on said chain saw;

said sprocket drive wheel being disposed adjacent said rearward end and near to said one slot;

a tensioning device for holding said guide bar, said sprocket drive wheel and saw chain together under tension to define said preassembled component; and, said tensioning device being mounted in said guide bar so as to constitute a part thereof;

said tensioning device including a pressure piece supported in said guide bar so as to be displaceable therein in a direction toward said sprocket drive wheel;

said tensioning device further including a spring for resiliently biasing said pressure piece toward said sprocket drive wheel;

said pressure piece being a slide and said tensioning device further including guide means for slidably guiding said slide between said side plates; and, said guide bar defining a longitudinal axis and including two side plates and a center plate disposed between said two side plates; said guide means including a cutout formed in said center plate; said cutout extending along said longitudinal axis and having an open end opening toward said sprocket drive wheel; and, said slide being slideably mounted in said cutout so as to be movable toward and away from said sprocket drive wheel.

13. The cutting arrangement of claim 12, said guide bar defining a longitudinal axis and said cutout having first and second parts arranged along said axis and said slide being movably mounted in a first one of said parts; said resilient biasing means being a spring having a plurality of folds to define an approximately sinusoidal trace; said spring being disposed in the second one of said parts and being disposed between said side plates with slight play; and, said second part having a rectangular configuration.

14. The cutting arrangement of claim 12, said sprocket drive wheel having two side cover discs; said slide being a flat part having approximately the same thickness as said center plate; and, said flat part having a free end facing toward said sprocket drive wheel and having a widening formed on said free end for making a lateral force-tight contact engagement with said cover discs of said sprocket drive wheel.

15. The cutting arrangement of claim 14, said widening being defined by a projection formed on said flat part and said projection being adapted to said cover discs.

16. The cutting arrangement of claim 14, said widening being defined by a plurality of bent-over tangs.

17. The cutting arrangement of claim 14, each of said slots having a width; and, said flat part having a width greater than the width of said slots.

18. The cutting arrangement of claim 12, said slide having an end face adapted to the contour of the sprocket drive wheel; said slide being mounted in said cutout so as to be movable therein between a first position wherein said slide presses with said end face against said sprocket drive wheel to hold said sprocket drive wheel at a predetermined distance from said rearward end of said guide bar in the preassembled component and a second position wherein said end face of said slide is lifted off said sprocket drive wheel; and, said tensioning device further including holding means for holding said slide against said sprocket drive wheel when said slide is in said first position.

19. The cutting arrangement of claim 18, said cutout having a rearward end opposite said open end; and, said holding means being a pressure spring for supporting said slide against said rearward end of said cutout.

20. The cutting arrangement of claim 19, said cutout having first and second parts arranged along said axis and said slide being movably mounted in one of said two parts; each one of said side plates having one of said slots formed therein; said one part of said cutout being partially coincident with said two slots; and, said slide having a through opening for accommodating said attachment bolt when said preassembled component is mounted on said chain saw.

21. The cutting arrangement of claim 20, said one attachment bolt being a first attachment bolt and said cutting arrangement further comprising a second attachment bolt for extending through said slots; and, said slide including a pass-through opening for receiving said second attachment Dolt when said cutting arrangement is mounted on said chain saw.

22. The cutting arrangement of claim 21, said positioning means being a latching member for coacting with said through opening for latching said guide bar; said slide having an additional opening formed therein; and, said second attachment bolt coacting with said additional opening for counter latching said guide bar.

23. The cutting arrangement of claim 20, further comprising positioning means for engaging said slide when said preassembled component is mounted on said chain saw so as to displace said slide against the force of said pressure spring; said drive sprocket wheel defining a shaft axis and said through opening of said slide defining a center axis separated from said shaft axis by a first spacing between said axes; and, said first spacing being determined by said drive shaft of said chain saw and said attachment bolt.

24. The cutting arrangement of claim 23, said chain saw having a housing and said housing having a receiving bore formed therein; said attachment bolt having an inner end engaging said receiving bore and an outer end which is passed through said slots and said through opening; said positioning means including a thickening formed on said attachment bolt spaced from said inner and outer ends thereof and along a segment of said attachment bolt; said thickening having a thickness which increases along said segment; and, said thickening having a maximum thickness which fits into said through opening.

25. The cutting arrangement of claim 23, said positioning means including a pin having a conically tapered head formed thereon; and, said conically tapered head having a maximum diameter adapted to fit into said through opening of said slide.

26. The cutting arrangement of claim 23, said positioning means being a latching member for coacting with said through, opening for latching said guide bar.

27. A cutting arrangement for a motor-driven chain saw having a drive shaft, the cutting arrangement comprising:

a preassembled component to be fastened to the chain saw;

at least one attachment bolt for connecting said preassembled component to said chain saw; and, the preassembled component including:

a saw chain;

a sprocket drive wheel for connecting said saw chain to said drive shaft;

a guide bar having a outer periphery and having a guide groove formed therein for guiding said saw chain along said outer periphery;

said guide bar having a forward end and having nose means at said forward end for guiding the saw chain as said saw chain moves around said guide bar;

said guide bar having a rearward end facing away from said forward nose means and having at least one slot formed therein for receiving said attachment bolt when said preassembled component is mounted on said chain saw;

said sprocket drive wheel being disposed adjacent said rearward end and near to said one slot;

a tensioning device for holding said guide bar, said sprocket dive wheel and saw chain together under tension to define said preassembled component; and, said tensioning device being mounted in said guide bar so as to constitute a part thereof;

said tensioning device including a pressure piece supported in said guide bar so as to displaceable therein in a direction toward said sprocket drive wheel;

said tensioning device further including a spring for resiliently biasing said pressure piece toward said sprocket drive wheel;

said pressure piece being a slide and said tensioning device further including guide means for slideably guiding said slide between said side plates; and, said chain saw having a housing on which the preassembled component is mounted; said sprocket drive wheel having an end face facing away from said housing; and, said stop means including a cap provided on said end face; and, a housing cover partially covering said guide bar; and, said cap being so dimensioned that said cap is spaced at a slight distance from said cover after said preassembled unit is mounted on said chain saw.

28. The cutting arrangement of claim 27, said cap having an outer tapered surface and having a recess formed therein; and, said cutting arrangement further comprising a ball bearing seated in said recess to define a stop member.

29. A cutting arrangement for a motor-driven chain saw having a drive shaft, the cutting arrangement comprising:

a preassembled component to be fastened to the chain saw;

at least one attachment bolt for connecting said preassembled component to said chain saw; and, the preassembled component including:

a saw chain;

a sprocket drive wheel for connecting said saw chain to said drive shaft when said preassembled component is mounted on said chain saw;

a guide bar having an outer periphery and having a guide groove formed thereon for guiding said saw chain along said outer periphery;

said guide bar having a forward end and having nose means at said forward end for guiding the saw chain as said saw chain moves around said guide bar;

said guide bar having a rearward end facing away from said forward nose means and having at least one slot formed therein for receiving said attachment bolt when said preassembled component is mounted on said chain saw;

said sprocket drive wheel being disposed adjacent said rearward end and near to said one slot;

tensioning means for holding said guide bar, said sprocket drive wheel and saw chain together under tension to define said preassembled component without said preassembled component being mounted on said chain saw; and, said tensioning means being mounted in said guide bar so as to constitute a part thereof.

30. The cutting arrangement of claim 29, said guide bar including two side plates and said tensioning means being arranged between said side plates.

31. The cutting arrangement of claim 29, said tensioning means including a pressure piece supported in said guide bar so as to be displaceable therein in a direction toward said sprocket drive wheel.

32. The cutting arrangement of claim 31, said tensioning means further including resilient biasing means for resiliently biasing said pressure piece toward said sprocket drive wheel.

33. The cutting arrangement of claim 32, said pressure piece being a slide and said tensioning means further including guide means for slideably guiding said slide between said side plates.

34. The cutting arrangement of claim 33, said sprocket drive wheel being axially displaceable on said drive shaft; and, stop means for limiting the axial displacement of said sprocket drive wheel relative to said drive shaft.

35. The cutting arrangement of claim 32, said resilient biasing means being a spring having a plurality of folds to define an approximately sinusoidal trace.

* * * * *

UNITED STATES PATENT AND TRADEMARK OFFICE

CERTIFICATE OF CORRECTION

PATENT NO. : 5,345,686

DATED : September 13, 1994

INVENTOR(S) : Helmut Zimmermann

It is certified that error appears in the above-identified patent and that said Letters Patent is hereby corrected as shown below:

In Column 1, line 8, delete "chair" and substitute -- chain -- therefor.
In Column 5, line 43, delete "On" and substitute -- In -- therefor.

Claims:
In column 8, line 51, delete "motor-drive" and substitute -- motor-driven --. therefor.
In column 10, line 23, delete "Dolt" and substitute -- bolt -- therefor.
In column 10, line 60, between "though" and "opening", delete ",".
In column 11, line 4, delete "a" (second occurrence) and substitute --an-- therefor.
In column 11, line 19, delete "dive" and substitute --drive-- therefor.

Signed and Sealed this

Thirteenth Day of December, 1994

Attest:

BRUCE LEHMAN

Attesting Officer

*Commissioner of Patents and Trademarks*